United States Patent [19]

Chatelin et al.

[11] Patent Number: 5,194,454
[45] Date of Patent: Mar. 16, 1993

[54] ANTISEPTIC MATERIAL WITH GRAFTS COMPLEXED BY METAL IONS AND PROCESS FOR ITS PREPARATION

[75] Inventors: Roger Chatelin, Lissieu; Louis Gavet; Michel Bourgeois, both of Lyons; Christine Darroux, Ecully, all of France

[73] Assignee: Centre Technique Industriel dit: Institut Textile De France, France

[21] Appl. No.: 647,147

[22] Filed: Jan. 29, 1991

[30] Foreign Application Priority Data

Feb. 5, 1990 [FR] France .................. 90 01621

[51] Int. Cl.⁵ .................. C08F 283/01; C08F 2/46; C08F 255/02; C08L 23/12
[52] U.S. Cl. .................. 522/88; 522/89; 522/115; 522/116; 522/120; 522/123; 523/122
[58] Field of Search .................. 522/88, 89, 87, 149, 522/157, 161, 115, 116, 120; 523/122

[56] References Cited

U.S. PATENT DOCUMENTS

| | | | |
|---|---|---|---|
| 2,998,329 | 8/1961 | Sovish et al. | 522/89 |
| 3,297,525 | 1/1967 | Grier | 523/122 |
| 3,814,676 | 6/1974 | Williams et al. | 522/89 |
| 3,872,128 | 3/1975 | Byck | 523/122 |
| 4,072,640 | 2/1978 | Sosa | 522/89 |
| 4,179,401 | 12/1979 | Garnett et al. | 522/89 |
| 4,299,917 | 11/1981 | Berger et al. | 435/19 |
| 4,340,057 | 7/1982 | Bloch et al. | 522/89 |
| 4,547,503 | 10/1985 | Petersen et al. | 544/353 |
| 4,556,658 | 12/1985 | Grohe et al. | 544/363 |
| 4,952,695 | 8/1990 | Groche et al. | 546/152 |

FOREIGN PATENT DOCUMENTS

| | | | |
|---|---|---|---|
| 0641174 | 5/1962 | Canada | 522/87 |
| 0910233 | 9/1972 | Canada | 522/89 |
| 0608813 | 5/1978 | U.S.S.R. | 522/88 |
| 1141271 | 1/1969 | United Kingdom . | |

OTHER PUBLICATIONS

"Radiation Induced Grafting of Methacrylic Acid onto Silk for the Immobilization of Antimicrobial Drug for Sustained Delivery", H. Singh et al., Angewandte Makromolekulaire Chemie, 172, (1989) pp. 87–102.

Primary Examiner—Marion E. McCamish
Assistant Examiner—Susan Berman
Attorney, Agent, or Firm—Ladas & Parry

[57] ABSTRACT

According to the invention the material, in particular a textile, includes in its polymeric structure grafts forming complexes with at least one metal ion possessing recognized antiseptic activity. These grafts are formed by polymerization of unsaturated monomers with a complexing function, including the phosphate of ethylene glycol methacrylate or a polymerizable derivative of quinoline such as acryl 8-hydroxy quinoline. The process of preparation comprises a first step of grafting, for example by electronic irradiation of the material and impregnation with a bath of monomer, and a second step of impregnation of the grafted material with one or serveral baths containing the metal ion(s), such as copper, zinc, tin, mercury.

2 Claims, No Drawings

ANTISEPTIC MATERIAL WITH GRAFTS COMPLEXED BY METAL IONS AND PROCESS FOR ITS PREPARATION

The present invention relates to a material, in particular a textile, possessing antiseptic properties which are conferred on it by one or more metal ions such as copper and zinc. It also relates to the process for the preparation of such a material making use of a grafting technique.

Materials of this type have been known for a long time, in particular from the publications of M. ROGOVIN, for example FR.A.1.499.358 and G.B.A.1.141.271. That case relates to a cellulosic material which is grafted with acrylic acid, then is placed in contact with a solution containing cupric ions such that, by ion exchange, the cupric ions become bound to the terminal carboxyl groups of the grafts. The material thus prepared has antiseptic properties which are conferred on it by the cupric ion.

These materials have undergone little development, mainly owing to the lack of chemical stability of the bond between the cupric ion and the terminal carboxyl group over a range of pH extending from very acid pHs to the basic pHs associated with detergent media. Thus, the material can not be washed under normal conditions, otherwise a large portion of the cupric ions pass into the washing bath and the material looses its antiseptic character.

Another approach has been explored which makes use of the binding by ion exchange of metal ions with antiseptic properties. This approach, developed by the Japanese company KANEBO, makes use of ion exchangers in the form of a mineral powder which is included during the spinning of chemical fibres. This technique exhibits extreme limitations. On the one hand, it is limited to chemical fibres only and thus cannot be used with natural fibres; on the other hand, since the amount of mineral powder included must not perturb the spinning, the proportion of metal ions is limited.

The aim which the applicant has set himself is that of suggesting a material, in particular a textile, which exhibits antiseptic properties over a large pH range comprising extreme acid and alkaline pHs, and the proportion of metal ions in which, conferring antiseptic properties on it, may vary within wide limits.

This aim is attained by the material of the invention. It is a grafted polymeric material having, in the manner discovered by ROGOVIN, metal ions with antiseptic properties bound to grafts. Characteristically, at least some of the grafts form complexes with the metal ion(s).

The binding forces implicated during the complexation are such that they confer on the material the required stability over the pH range 0 to 12.

The complexing grafts are preferably obtained by polymerization of at least one unsaturated monomer possessing at least one complexing function.

In the preferred version of the material of the invention, the complexing grafts are obtained by polymerization of at least one ethylenic ester of the phosphoric acid of general formula

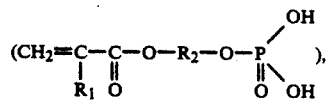

in which $R_1$ is selected from H and alkyl and $R_2$ is selected form alkylene or the oxides and/or polyoxides of alkylene.

In the preferred material, the ethylenic ester of the phosphoric acid is the phosphate of ethylene glycol methacrylate, designated hereafter EGMAP, in which $R_1$ is the $CH_3$ group and $R_2$ is the $(CH_2-CH_2)$ group. This substance offers many advantages. It is particularly soluble in water, which permits concentrated solutions to be used during grafting leading to particularly high levels of grafting, higher than 50%. Furthermore, the forces involved in the complexation of metal ions are particularly high, and this guarantees excellent chemical stability of the material.

Of all of the possible materials of the invention, mention may be made of those in which the complexing grafts are obtained by means of polymerization of at least one polymerizable derivative of quinoline, in particular 8-hydroxy quinoline acrylate.

Of the metal ions possessing recognized antiseptic properties and capable of forming complexes, copper, zinc, tin and mercury may be mentioned.

Another object of the invention is to suggest a process specially suited to the preparation of the previously mentioned materials. This process consists of carrying out a grafting reaction on a polymeric material using at least one unsaturated monomer possessing at least one complexing function, then of placing the thus grafted material in contact with an ionic solution of at least one metal having antiseptic activity.

The grafting reaction consists of activating the material, for example by irradiation, so as to create reactive sites and of putting it in contact with the monomer.

In the case of a hydrophobic material, such as polypropylene, the irradiation step precedes the step in which the irradiated material is impregnated by the solution of monomer.

In the case of a hydrophilic material, such as cotton or viscose, the impregnation step may precede the irradiation step.

The invention will be better understood and other advantages and characteristics will become apparent from reading the description which will be given of several examples of the embodiment of antiseptic materials with grafts complexed by metal ions.

1° EXAMPLE

The textile material is a polypropylene tissue. It is subjected to electronic irradiation at 10 kGy, plunged into a solution of ethylene glycol methacrylate phosphate(EGMAP) containing 0.5 to 1g/l of copper sulfate to slow down homopolymerization, then purged for 3 minutes with nitrogen before being heated at 100° C. for 3 h.

Table 1 below gives the values for the extent of grafting (A) and the binding capacity (B) of the grafts as a function of the concentrations of EGMAP ($C_1$) and copper sulfate ($C_2$) in the impregnation solution. The extent of grafting Eg (A) is measured after extraction and is equal to $$Eg = \frac{W_1 - W_0}{W_1}$$

in which $W_1$ is the weight of the grafted material and $W_0$ its weight before grafting.

| $C_1$ (%) | $C_2$ (%) | A (%) | B (meq/g) |
|---|---|---|---|
| 5 | 0,5 | 28 | 1,3 |
| 10 | 0,5 | 42 | 2 |
| 15 | 1 | 52 | 2,5 |

The values gives for the extent of grafting (A) are the mean values of ten very highly reproducible assays (deviation +2%).

This first example illustrates the possibility of obtaining very considerable extents of grafting with EGMAP, leading to high binding capacities (B), both in ion exchange and in complexation.

It should also be noted that the EGMAP solution is obtained by simple dilution of a 76% concentrated stock solution which is preserved during storage without special precautions other than the addition of 200 ppM of stabilizers.

2° EXAMPLE

The textile material is a cotton tissue. The grafting operation is done by impregnation of a 30% EGMAP solution, followed by wringing out of the impregnated tissue such that the extent of take up is 100%, then irradiation of the impregnated material in an inert medium in a vacuum.

Different assays were performed, using doses of irradiation varying from 10 to 30 kGy. The percentages of grafting obtained are practically constant, being included between 15.1 and 17% whatever the dose used.

3° EXAMPLE

The material is a non-woven textile containing 80% viscose and 20% polyester. The grafting conditions are the same as for example 2. The extent of grafting is 17.4 for doses of 10 and 20 kGy.

Furthermore, assays have been carried out with irradiation in the presence of air, and no longer in an inert medium. The extent of grafting obtained was 12.8% for irradiation with 10 kGy and 12.9% for irradiation with 20 kGy.

The materials grafted according to the above examples are capable of complexing metal ions known for their antiseptic activity, such as copper, zinc, tin and mercury, within concentration limits which depend on the binding capacity of the grafted material.

Complexation is essentialy immediate after a single impregnation, padding of the grafted material in a bath containing the different metal salts.

It is a matter for the person skilled in the art to determine, as a function of the use to which the material will be put, the different parameters involved in order to obtain the concentrations of complexed metal ions. One factor is the extent of grafting which determines the metal ion binding capacity of a given complexing monomer. Another factor is the metal ion concentrations of the impregnation bath(s), depending on the procedure adopted. For example, if the impregnation is carried out by forced passage of the bath through the material, in a manner similar to filtration, the binding of all of the metal ions will be practically complete and the bath will be exhausted, obviously up to saturation of the complexing functions. On the other hand, if the impregnation is performed continuously by passage of the material into a bath, followed by padding, it will be necessary to make provision for replenishment of the solution by a metering pump in order to take into account the scale of affinities between the complexing functions and the different metal ions present in the bath. Where appropriate, the impregnation may be done by successive passages through several baths, each bath containing one or more specific metal salts.

The amounts of metal ions complexed are relatively low for applications of the cutaneous type, of the order of several grams of metal per kg of material; they are greater, ranging up to several tens of grams for other uses such as the sterilization of water. In the case of complexation of several grams of metal ions per kg of material, the extent of grafting required is low, of the order of 2%.

The spectrum of activity of the material thus made antiseptic is a function of the complexed metal ion(s). As has just been observed, this spectrum is completely variable owing to the material of the invention and depends on the extent of grafting and the amounts of complexed metal ions. This is a considerable advantage compared with materials in which the antiseptic metal ion forms an integral part of a polymer such as tributyl tin polyacrylate described in the patent DD.A.207740. In this case, the tin is linked covalently to the polymer, and not by ion exchange or complexation. The spectrum of activity of the material is defined once and for all by the amount of polymer included in the material. It can not be varied by a simple impregnation as has been described for the material of the invention.

The materials with grafts complexed by antiseptic metal ions are quite stable from very acidic pHs (pH0) up to the basic pHs (pH12) associated with the common detergent media.

The invention is not limited to the embodiment which has just been described as a non-exhaustive example, but covers all of the variants. In particular, the grafting may be performed starting with a mixture of unsaturated monomers, provided that one of them bears complexing functions for metal ions with antiseptic activity.

We claim:

1. A grafted polymeric material having antiseptic properties wherein at least some of the grafts are obtained from acryl 8-hydroxy quinoline and said material contains at least one complexing function which forms complexes with at least one metal ion having antiseptic activity.

2. The grafted polymeric material of claim 1 wherein said metal ion is selected from copper, zinc, tin and mercury.

* * * * *